Patented Mar. 16, 1954

2,672,472

UNITED STATES PATENT OFFICE 2,672,472

BIS-MERCAPTOMERCURI DERIVATIVES OF CYCLIC-CARBOXAMIDES AND METHOD OF PREPARING SAME

Harry L. Yale, New Brunswick, N. J., assignor to Mathieson Chemical Corporation, New York, N. Y., a corporation of Virginia No Drawing. Application November 13, 1951, Serial No. 256,143

10 Claims. (Cl. 260—434)

This invention relates to, and has for its object, the provision of [A] compounds of the general formula

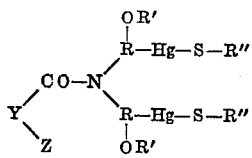

wherein Z is a member of the class consisting of —COOH, —CH₂COOH, —O—CH₂COOH and —SO₃H groups, Y is a divalent cyclic organic group, R is a lower-alkylene group, R' is a member of the class consisting of hydrogen and lower-alkyl groups, and R'' is an organic group linked to the sulfur through a carbon atom thereof; [B] salts thereof; and [C] method of preparing [A] and [B]. These compounds are valuable therapeutic agents, especially diuretics.

The divalent cyclic groups represented by Y include: aromatic radicals (e. g., of benzene, naphthalene); alicyclic radicals (e. g., of cyclohexane, trimethylcyclopentane); and heterocyclic radicals (e. g., of pyridine, furan, thiophene, pyrrolidine).

Among the organic groups represented by R'' are the following: carboxyalkyl- and esters thereof (e. g., —CH₂COOH), iminoalkyl

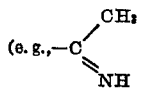

and

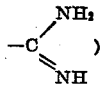

carboxyaminoalkyl- (e. g.,

—CH₂CH(NH₂)COOH)

aryl (e. g., o-carboxyphenyl- and o-methoxyphenyl-), and heterocyclic (e. g., C-thiazolyls- and C-pyrimidyls-).

The invention comprises especially water-soluble salts of compounds of the general formula

wherein X is a divalent mono-carbocyclic radical.

The compounds of this invention may be obtained by the method essentially comprising interacting compounds of the general formula

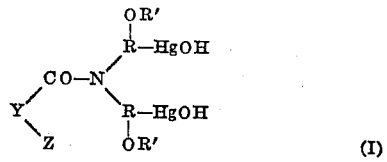

(I)

with a compound of the general formula R'''—S—R'' (II), wherein R''' is a member of the class consisting of hydrogen, alkali metals (including ammonium) and alkaline-earth metals (e. g., calcium); and where the water-soluble salts are desired, one or both of the reactants are employed in the water-soluble salt form, or the reaction product is salified in the conventional manner.

Among the utilizable reactants I are:

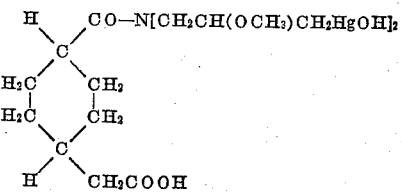

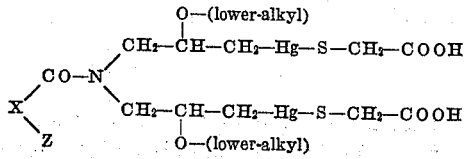

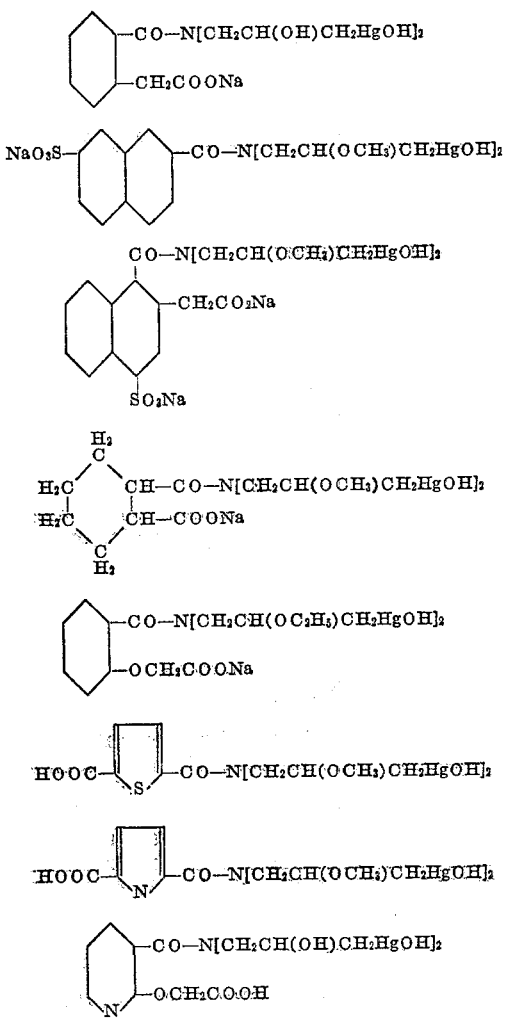

Among the utilizable reactants II are: potassium ethylxanthate, sodium thioacetate, sodium thioglycollate, thiourea, N-methyl thiourea, thioacetamide, thiouracil, and sodium thiobarbiturate.

The following examples are illustrative of the invention:

EXAMPLE 1

*Trisodium salt of o-{[bis-(γ-carboxymethylmercaptomercuri - β - methoxy)propyl]carbamyl} phenoxyacetic acid* a. *N,N-diallylacetylsalicylamide.*—To a stirred, ice-cooled solution of 50 g. (0.25 mole) acetylsalicyloyl chloride [J. C. S. 89, 1318 (1906)] and 25 g. (0.25 mole) N-methylmorpholine in 500 cc. dry benzene is added dropwise 25 g. (0.25 mole) redistilled diallylamine in 200 cc. dry benzene. The mixture is allowed to stand at room temperature for three days, filtered, and the filtrate concentrated (the insoluble N-methylmorpholine hydrochloride weighs about 33.5 g., compared to the theoretical 34.1 g.). The concentrated filtrate is distilled, and the product distilling at 160–177° C./2 mm. collected.

b. *N,N-diallylsalicylamide.*—The product prepared in *a* is mixed with 200 ml. 5% aqueous NaOH at room temperature, solution occurring within five minutes. After about one hour the mixture is acidified, yielding N,N-diallylsalicylamide in quantitative amount; and, after recrystallization from 50% ethanol, the product melts at about 92–93° C.

c. *o-(N,N - diallylcarbamyl) phenoxyacetic acid.*—A mixture of 31 g. (0.106 mole) of N,N-diallylsalicylamide, 10.0 g. chloracetic acid and 14.5 g. (0.212 mole) of KOH in 500 cc. 95% ethanol is stirred, refluxed for eight hours, cooled and filtered (the KCl which forms weighs about 4.5 g.). The alcoholic filtrate is concentrated to dryness, the residue dissolved in water, and the solution made slightly acid with 10% HCl. The acidified solution is then treated with an excess of NaHCO₃, and filtered (the insoluble material, weighing about 12 g., is unreacted starting material); and the filtrate is acidified, yielding an oily product.

d. *o-{[Bis-(γ - hydroxymercuri - β - methoxy) propyl]carbamyl}phenoxyacetic acid.*—The oily product obtained in *c* is taken up in 200 ml. methanol and treated with 33.4 g. (0.12 mole) of mercuric acetate in 250 ml. methanol; 400 ml. of the methanol solution (A) is poured into 2 liters of water. The gelatinous precipitate, of a hydroxide of the formula

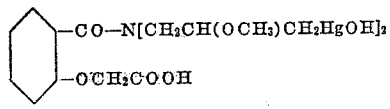

is isolated by centrifuging, and dried.

[When 50 ml. of the methanolic solution A is poured into 400 ml. of 2% sodium chloride solution, there is obtained about 3.5 g. of a crystalline solid

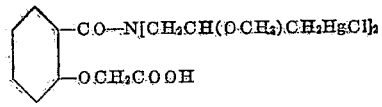

which sinters at about 90° C. and decomposes at about 140° C.]

e. *Trisodium salt of o-{[bis-(γ - carboxymethylmercaptomercuri - β - methoxy)propyl]ar-bamyl}phenoxyacetic acid.*—1.0 g. of the hydroxide obtained in *d*, 1.35 g. of normal NaOH, and 250 ml. water are stirred until clear, and then treated with 0.35 g. 71% sodium thioglycolate, 2.7 ml. normal NaOH and 100 ml. water. The clear solution is clarified with a filter aid (e. g., Hyflo), and freeze-dried; on assay the product yields the following results: N, 1.70; S, 6.26; Na, 7.25; and Hg, 36.57.

EXAMPLE 2

*Trisodium salt of p-{[bis-(γ-carboxymethylmercaptomercuri-β-methoxy)propyl]carbamyl}cyclohexanecarboxylic acid* a. *Dimethyl ester of 1,4-cyclohexanedicarboxylic acid.*—40 g. dimethyl ester of terephthalic acid [Ber. 37, 2001 (1904)], is reacted with 5 g. platinic oxide and 259 ml. pure glacial acetic acid, following the method given in J. Ind. Inst. Sci. 22A, 262–74 (1939), to obtain the dimethyl ester of 1,4-cyclohexanedicarboxylic acid.

b. *Monomethyl ester of 1,4-cyclohexanedicarboxylic acid.*—To 40 g. (0.2 mole) dimethyl ester of 1,4-cyclohexanedicarboxylic acid in 600 ml. of methanol is added slowly, with stirring, 13.2 g. (0.2 mole) 85% KOH in 200 ml. of methanol; and the clear solution is refluxed three hours and concentrated on the steam bath. The residue is then partitioned between 300 ml. of ether and 200 ml. of water, and the water layer is separated and acidified with 20% hydrochloric acid to pH 2.0. After cooling, the solid is filtered and recrystallized twice from hot water; it weighs about 25 g. and melts at about 102–5° C.

[The compound can be further purified by recrystallization with 5 ml. carbon tetrachloride per gram of crude compound to give a purer sample of the half ester, melting at about 112–114° C.]

c. *Methyl ester of 4-chloroformyl-cyclohexanecarboxylic acid.*—A mixture of 27.5 g. of the crude ester prepared in *b* and 34.5 g. purified thionyl chloride is allowed to stand overnight, refluxed three hours, and worked up to give about 28.5 g. of the product, boiling at about 105–109° C. at 10 mm. pressure.

d. *Methyl ester of 4-(N,N-diallylcarbamyl) cyclohexanecarboxylic acid.*—To an ice-cold mixture of 28.1 g. of the ester prepared in *c*, 200 ml. dry benzene, and 14.2 g. N-methylmorpholine is added 13.6 g. redistilled diallylamine in 50 cc. dry benzene, yielding the methyl ester of 4-(N,N-diallylcarbamyl) cyclohexane-carboxylic acid.

This methyl ester in methanol is treated with KOH in methanol, refluxed, concentrated, dissolved in water, and acidified, yielding 4-(N,N-diallylcarbamyl) cyclohexanecarboxylic acid. Using a molar equivalent of this product in place of the o-(N,N-diallylcarbamyl)phenoxyacetic acid used in Example 1d, there is obtained the trisodium salt of p-{[bis-(γ-carboxymethylmercaptomercuri-β-methoxy)propyl] carbamyl} cyclohexanecarboxylic acid, having the following formula:

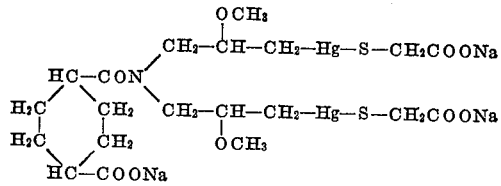

EXAMPLE 3

*Trisodium salt of o-{[bis-(γ-carboxymethylmercaptomercuri - β-methoxy) propyl]carbamyl}benzoic acid*

Using a molar equivalent of the diallylamide of phthalic acid in place of the o-(N,N-diallylcarbamyl)phenoxyacetic acid used in Example 1d, there is obtained a compound having the formula

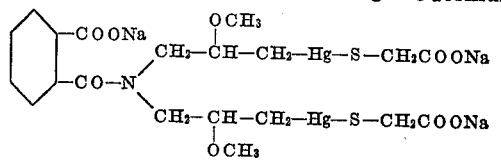

EXAMPLE 4

*Trisodium salt of N,N-bis(γ-carboxymethylmercaptomercuri - β-methoxypropyl) camphoramic acid*

Using a molar equivalent of the (N,N-diallylcarbamyl) camphoric acid, prepared by interaction of camphoric anhydride (1 mol.) with an alcoholic solution of diallylamine (2 mols.), in place of the o-(N,N-diallylcarbamyl)phenoxyacetic acid used in Example 1d, there is obtained a compound having the formula

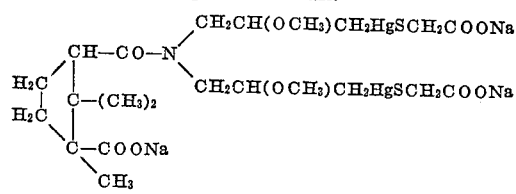

The invention may be embodied in various other ways, within the scope of the appended claims.

I claim:
1. Compounds of the class consisting of: [A] compounds of the general formula

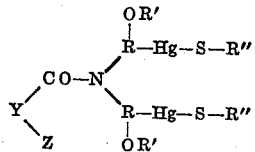

and [B] water-soluble salts thereof, wherein Z is a member of the class consisting of —COOH, —CH₂COOH, —O—CH₂COOH and —SO₃H groups, Y is a divalent cyclic organic group of the group consisting of monocarboxylic and mononuclear heterocyclic, R is a lower-alkylene group, R' is a member of the class consisting of hydrogen and lower-alkyl groups, and R'' is a member of the class consisting of —(lower alkylene)—COOH, —(lower alkylene)—COO(lower alkyl), —(lower alkylene)imino, aryl, and —C—pyrimidyl.

2. Compounds of the class consisting of: [A] compounds of the general formula

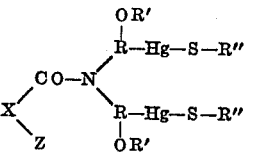

and [B] water-soluble salts thereof, wherein Z is a member of the class consisting of —COOH, —CH₂COOH, —O—CH₂COOH, and —SO₃H groups, X is a divalent mono-carbocyclic radical, R is a lower-alkylene group, R' is a member of the group consisting of hydrogen and lower-alkyl groups, and R'' is a member of the class consisting of —(lower alkylene)—COOH, —(lower alkylene)—COO(lower alkyl), —(lower alkylene)imino, aryl, and —C—pyrimidyl.

3. Compounds of the class consisting of: [A] compounds of the general formula

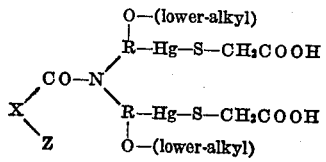

and [B] water-soluble salts thereof, wherein Z is a member of the class consisting of —COOH, —CH₂COOH, —O—CH₂COOH, and —SO₃H groups, X is a divalent mono-carbocyclic radical, and R is a lower-alkylene group.

4. A trialkali-metal salt of a compound of the general formula

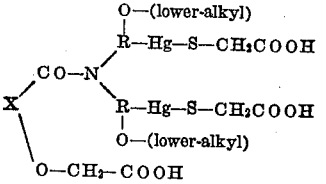

wherein X is a divalent mono-carbocyclic radical, and R is a lower-alkylene group.

5. A trialkali-metal salt of a compound of the general formula

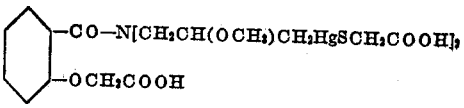

6. The method which essentially comprises interacting a compound of the general formula

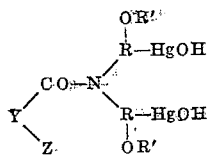

with a compound of the general formula R'''—S—R'', wherein Z is a member of the class consisting of —COOH, —CH₂COOH,

and —SO₃H groups, Y is a divalent cyclic organic group, R is a lower-alkylene group, R' is a member of the group consisting of hydrogen and lower-alkyl groups, R'' is an organic group linked to the sulfur through a carbon atom thereof, and R''' is a member of the class consisting of hydrogen, alkali metals and alkaline earth metals.

7. The trisodium salt of p-{[bis-(γ-carboxymethylmercaptomercuri - β - methoxy)propyl]carbamyl}cyclohexanecarboxylic acid.

8. The trisodium salt of o-{[bis-(γ-carboxymethylmercaptomercuri - β - methoxy)propyl]carbamyl}benzoic acid.

9. The trisodium salt of N,N-bis(γ-carboxymethylmercaptomercuri-β-methoxypropyl)camphoramic acid.

10. The trisodium salt of o-{[bis-(γ-carboxymethylmercaptomercuri - β - methoxy)propyl]carbamyl}phenoxyacetic acid.

HARRY L. YALE.

References Cited in the file of this patent

UNITED STATES PATENTS

| Number | Name | Date |
|---|---|---|
| 1,895,713 | Hentrich et al. | Jan. 31, 1933 |
| 1,969,357 | Christiansen et al. | Aug. 7, 1934 |
| 2,300,992 | Tabern | Nov. 3, 1942 |
| 2,557,772 | Shelton et al. | June 19, 1951 |
| 2,581,397 | Feinstone | Jan. 9, 1952 |
| 2,601,461 | Shelton | June 24, 1952 |

FOREIGN PATENTS

| Number | Country | Date |
|---|---|---|
| 619,515 | Great Britain | Mar. 10, 1949 |